United States Patent [19]

Carrillo

[11] Patent Number: 4,461,115
[45] Date of Patent: Jul. 24, 1984

[54] FISHING FLOAT

[76] Inventor: Ruben S. Carrillo, 828 N. Neptune Ave., Wilmington, Calif. 90744

[21] Appl. No.: 360,316

[22] Filed: Mar. 22, 1982

[51] Int. Cl.³ .............................................. A01K 93/00
[52] U.S. Cl. .................................................. 43/43.13
[58] Field of Search ........................................ 43/43.13

[56] References Cited

U.S. PATENT DOCUMENTS

| | | | |
|---|---|---|---|
| 3,003,277 | 10/1961 | Vann | 43/43.13 |
| 3,145,498 | 8/1964 | Kochis | 43/43.13 |
| 3,971,153 | 7/1976 | Harms | 43/43.13 |

Primary Examiner—Nicholas P. Godici
Assistant Examiner—Marc Hodak

[57] ABSTRACT

A fishing float is described having the unique capability of maintaining its position in a moving stream, thereby allowing the fisherman to place his lure in a given spot in a stream and in a repetitive manner. The float consists of a disc having a fin on one side and a fin on the opposite side that is orthogonal with respect to the first fin. Fish attaching points are located on the periphery of the disc and are each located approximately 45 degrees from each fin. Attaching a fishing line to a preferred attaching point is determined only by the direction of the stream relative to the fisherman.

4 Claims, 7 Drawing Figures

FISHING FLOAT

This invention describes a float and more particularly a fishing float having the unique capability of maintaining its position in a fast moving stream regardless of which side of the stream the fisherman is standing.

In the art of stream fishing it is important that the lure being used be repetitively cast in that area of the stream where the fisherman believes the fish are congregating.

Normally flycasting techniques require great precision by the fisherman in casting his fly to the area he has selected and then allowing the fly to float downstream, at which point the fisherman reels in the line and repeats the process over and over again until he is either rewarded or he selects a different area of the stream to fish.

The present invention describes a float for use by fisherman where it is desired to maintain the hook in a given location at some point downstream of the fisherman where the fisherman believes the fish are located.

The float described and claimed has a preferred construction that relies on the geometry caused by the fishing line attached to the float and by a pair of fins physically attached to the float that generates a resultant force as a result of the moving water that allows the float to stay in a given position as selected by the fisherman in playing out the line and moving the position of his rod.

A float constructed according to the teachings of the present invention consists of a floatable disc in the form of a life preserver that has a hollow central portion.

A streamlined first fin is located on a diameter of the disc and is physically attached to one side of the disc. A streamlined second fin is located on a second diameter that is orthogonal with respect to the first fin and is also attached to the disc but is located on the reverse side of the disc.

In the preferred embodiment a first pair of eyelets adapted to be individually attached to a fishing line are located on the periphery of the disc and in a preferred location. The eyelets may be integrally formed on the disc or they may be constructed of separate material physically attached to the disc. The specific form and shape of the eyelet are immaterial to the invention except that they provide a means for connecting the fishing line to the float.

A second pair of eyelets also adapted to be connected to a fishing line are connected to the periphery of the disc on a diameter and also in a preferred location.

The first pair of eyelets and the second pair of eyelets are located on diameters that are orthogonal with respect to each other and are so located on the periphery of the disc so that each eyelet is 45 degrees from each fin that is attached to the disc.

In actual practice the fisherman attaches his fishing line to a single eyelet determined only by the direction of the stream and the bank of the river or stream that he is located on. The eyelet opposite to the one that he properly selects is actually redundant and is added only for convenience to the fisherman.

Should the fisherman now fish from the opposite bank it will be necessary for him to relocate his fishing line to an adjacent eyelet in order to obtain the same benefits from his float as previously described. The opposite eyelet again is included only for convenience to the fisherman and does not perform any specific function to the operation of the float.

The geometry of the float is such that even in the event that the float is upended by turbulent water, there will be no change in the operation of the float and it will still maintain its preferred position regardless of whether it is continually upended and reversed. This feature will be described as the description of the invention continues.

Further objects and advantages of the present invention will be made more apparent by referring now to the accompanying drawings wherein.

Figure 1:
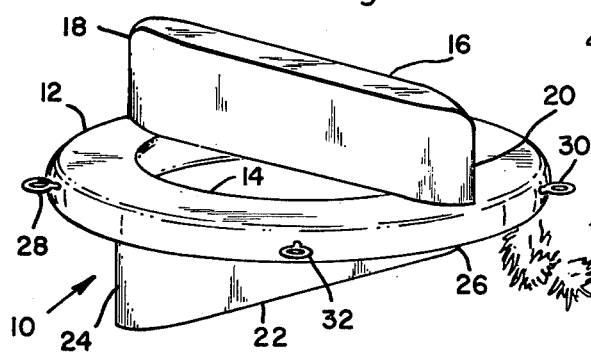
FIG. 1 is a perspective drawing of a float constructed according to the principles of this invention.

Referring now to FIG. 1, there is shown a float 10 constructed according to the principles of this invention. A floatable disc 12 is constructed in the form of a life preserver and contains a hollow central portion 14.

A first streamline fin 16 is streamlined and pointed at each end 18 and 20 and is physically attached to one side of disc 12 and along a first diameter of the disc.

A second streamlined fin 22 having pointed edges 24 and 26 is fixedly attached to the opposite side of the disc 12 and along a second diameter that is orthogonal with that defined by fin 16.

A pair of eyelets 28 and 30 are attached to the periphery of the disc 12 and along a diameter of the disc. A second pair of eyelets 32 and 34 are also physically attached to the periphery of the disc 12 and along a diameter of the disc.

Figure 2:
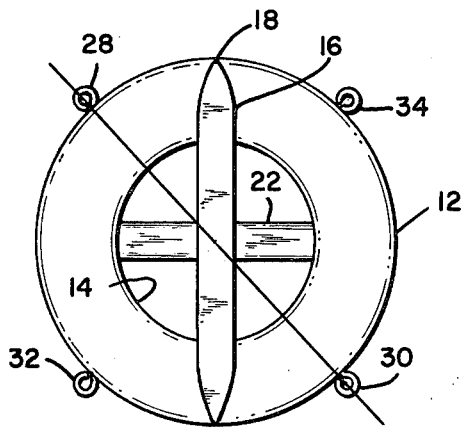
FIG. 2 is a top view of FIG. 1.

The diameter formed by eyelets 28 and 30 are orthogonal with respect to the eyelets formed by 32 and 34. Additionally, the location of the diameter formed by eyelets 28 and 30 and the diameter formed by eyelets 32 and 34 are selected so as to be 45 degrees from the diameter formed by fin 22 and fin 16. This relationship is more easily seen by also referring to FIG. 2 and FIG. 3.

Figure 4:
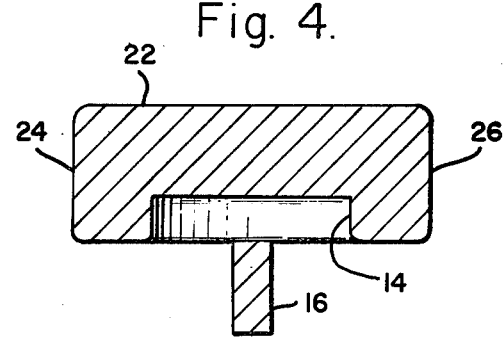
FIG. 4 is a cross-section taken along lines 4—4 of FIG. 3.
Figure 3:
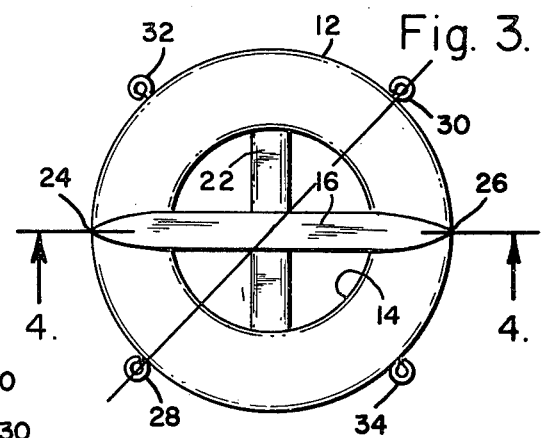
FIG. 3 illustrates the bottom view of FIG. 1.

Referring now to FIGS. 3 and 4, there is illustrated a bottom view of the float illustrated and shown in FIG. 1.

FIG. 3 more fully illustrates the orthogonal relationship between fin 22 and fin 16 and the fact that each eyelet is 45 degrees away from either fin.

In the preferred embodiment the connecting points 28, 30, 32 and 34 are illustrated as eyelets, however, it will be obvious to those skilled in the art that the connecting points for the fishing line may be of any form and it is envisioned that they may ultimately be formed integrally with the material forming disc 12. It is essential, however, to the practice of the invention that the location of the connecting points each be 45 degrees from a fin as shown.

Figure 5:
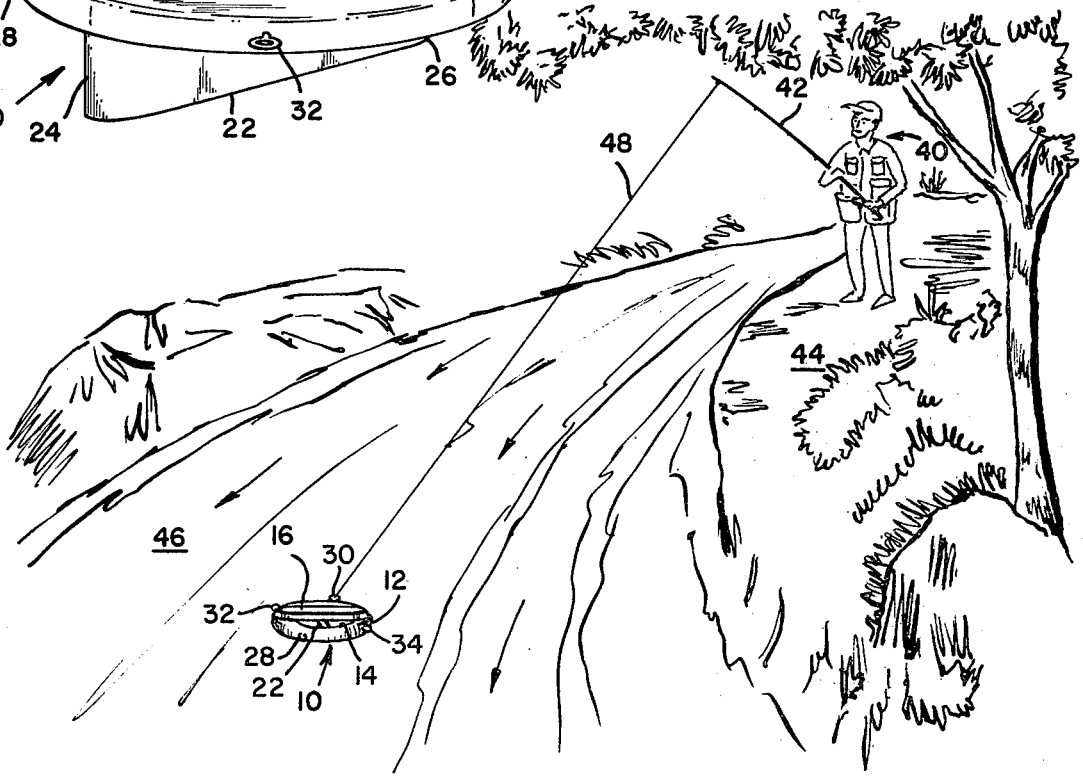
FIG. 5 illustrates a preferred use of the float described in this invention.

Referring now to FIG. 5, there is shown a pictorial representation of a fisherman 40 holding a fishing rod 42 on the bank of a river 44.

A float 10 constructed according to the teachings of this invention is located in the flowing stream 46 and attached to the fishing pole by means of the fishing line 48. The fishing line 48 is attached to eyelet 30 of the float. It will be recognized that the fishing line 48 could just as well have been connected to eyelet 28 which is located on the opposite diameter of the disc 12.

A review of the geometry will very quickly show that the float will assume either a first or second position in the water 46 and that either position will produce the same desired result.

For example, if we assume an arbitrary position for the float with the line 48 connected to eyelet 30, our first assumption will be that fin 16 will be located above the water as shown and that fin 22 would be located below the water. In this configuration the flowing stream will cause the fishing line 48 to grow taut and the flowing stream will react against fin 22 in such a manner that the vector of the resulting forces will be against the line 48 and in the direction of the arrow 50. As long as the stream is flowing the water will create a force 50 against the fin 22 and as long as the fisherman 40 maintains the line 48 in a given position, the float 10 will maintain its position regardless of the action of the flowing water.

If we assume, for example, that the float 10 is caused to reverse itself so as to place fin 16 in the water and fin 22 in the air, then we will realize immediately that the same situation as just described will be present. The fin 16 will create a force in direction 50 against the action of the line 48 and again the float 10 will be held in a given position in the stream as determined by the flowing water.

In either condition the position of the float can be varied by the fisherman simply allowing more line or less line as the case may be. The action of the water itself against the fin in the water will generate the reaction and the force necessary to keep the float in the position desired by the fisherman. The action of the water, if turbulent enough to upset the float, will not cause any change in the condition of the float or the position of the float since either position, upside down or right side up, will generate the same force and generate the same desired end which is to keep the float in a given position in the water.

This condition will be more fully illustrated in connection with FIGS. 6 and 7.

Figure 6:
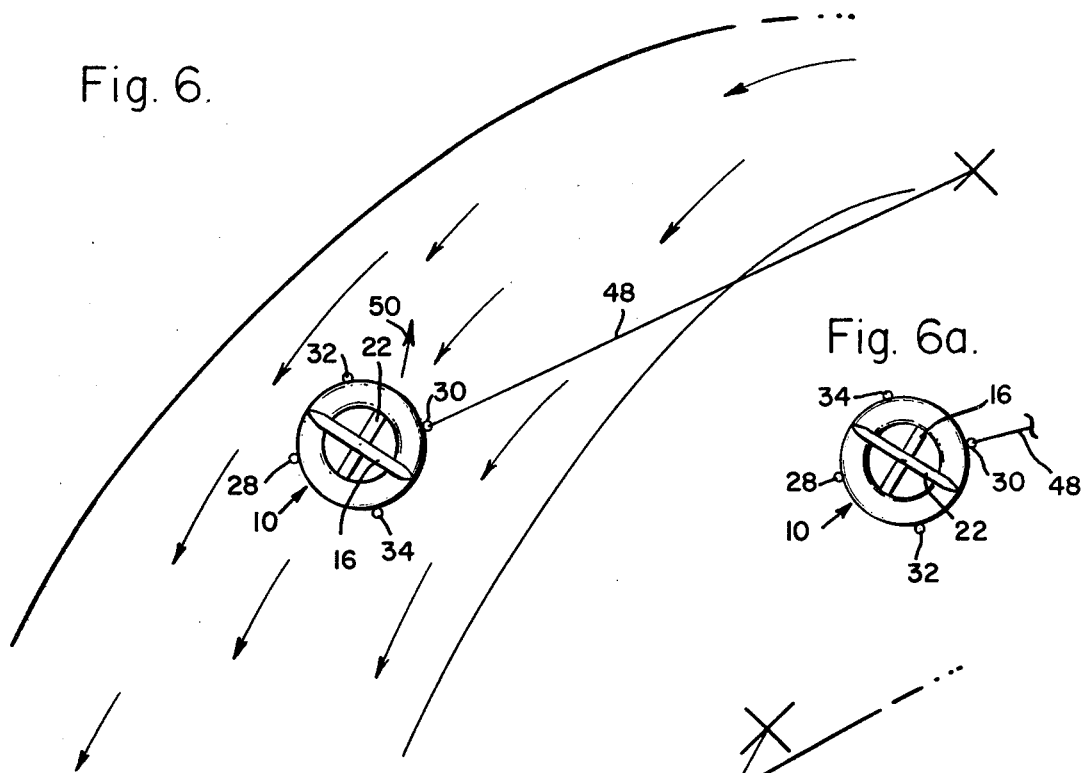
FIG. 6 illustrates the float being used with a fisherman on one side of a fast moving stream.
Figure 6A:
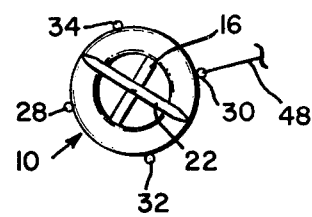

A review of FIG. 6 will show a situation very similar to that illustrated in FIG. 5, with the fisherman located on one bank and the fishing line connected to eyelet 30. The fin 22 is shown in the water generating a force 50 and in the direction which is away from the fisherman and due to the action of the water the float is kept in a relative constant position. In the event that the float 10 should be upset, and reference is made of FIG. 6a which is an illustration of float 10 in the same position as shown in FIG. 6 but with the float reversed showing that fin 16 is now in the water and fin 22 is now outside of the water. Since the fishing line 48 is still attached to eyelet 50, the geometry of the float is exactly the same at FIG. 6a as it is in FIG. 6. The force generated by fin 16 will be in the same direction 50 as shown in FIG. 6 and of the same magnitude.

Figure 7:
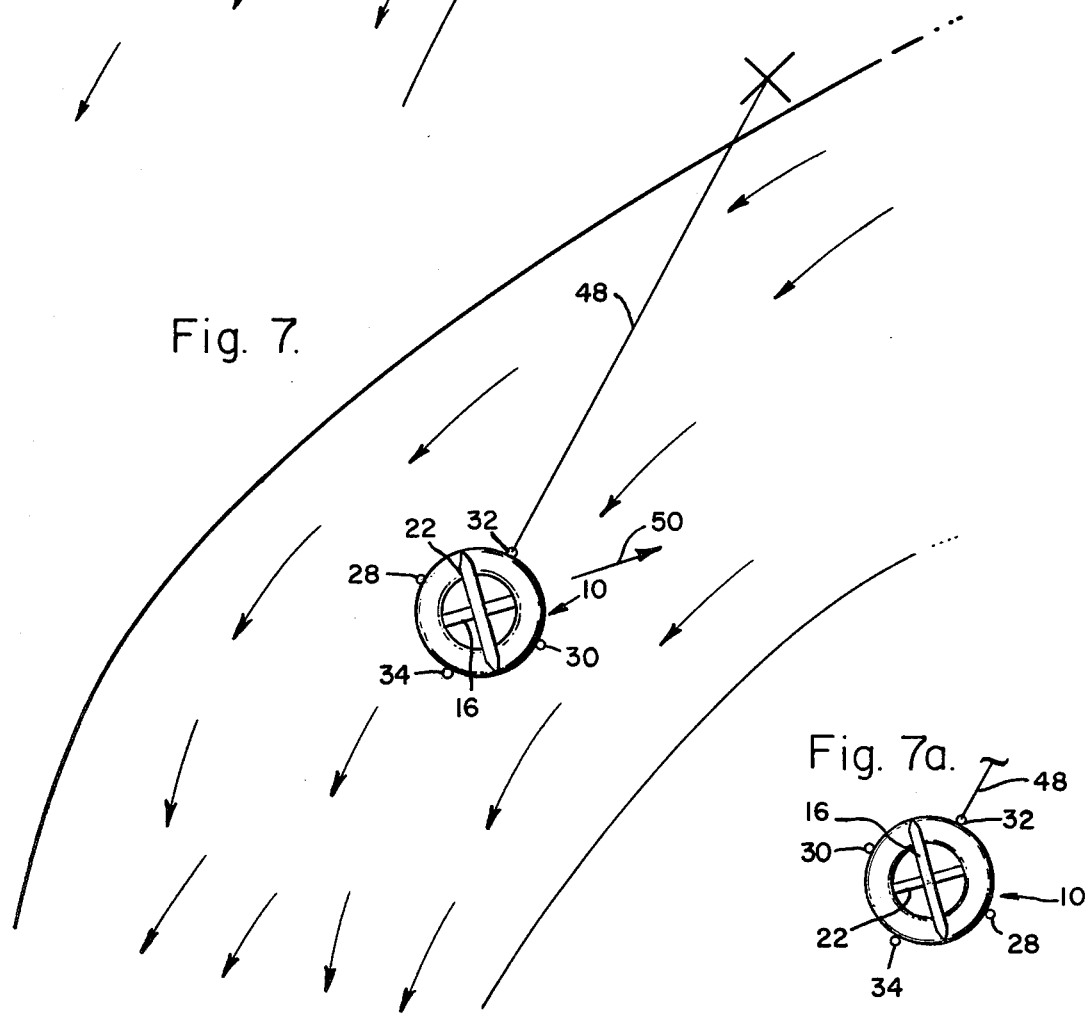
FIG. 7 illustrates the use of the float constructed according to the principles of this invention with the fisherman located on the opposite side of a fast moving stream.

FIG. 7 illustrates a similar stream situation as shown in connection with FIG. 6 only in this case the fisherman is located on the opposite side of the same stream. In this case the fishing line 48 must be connected to an adjacent eyelet which may either be 32 or 34. FIG. 7 shows the fishing line 48 connected to eyelet 30 which places fin 22 in the water and fin 16 outside of the water. In this situation a taut line will cause the moving water to generate a force against fin 22 in the direction 50 and of sufficient magnitude to keep the float 10 in a relatively constant position relative to the fisherman.

Figure 7A:
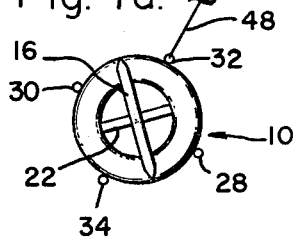

In the event float 10 should be upset as a result of the moving water, reference is now made to FIG. 7a which shows the same situation with line 48 connected to eyelet 32 and the float 10 in an upside down situation.

In this situation fin 16 is in the water and fin 22 is out of the water and, again, fin 16 will generate a force of the same magnitude and in the same direction as force 50 as shown in connection with FIG. 7.

It will be appreciated therefore that the only change required by the fisherman is to select the appropriate eyelet when going from one side of the river to the other. Once the proper eyelet is selected then the float is self-correcting whether it is upside down or right side up and will always generate the correct force to maintain its position while the fisherman holds the fishing line in a taut position.

I claim:

1. A fishing float capable of maintaining a fixed position in the moving stream comprising:
    a floatable disc with a hollow central portion adapted to remain open to the stream thereby forming a torus shaped structure in the form of a life preserver having a first side and a second side,
    a first fin located on the first diameter of said disc and attached to said first side,
    a second fin located on a second diameter of said disc that is orthogonal with said first fin and attached to said second side,
    a first line-connecting point adapted to be connected to a fishing line and attached to the periphery of said disc and located on a third diameter, and
    a second line-connecting point adapted to be connected to a fishing line and attached to the periphery of said disc and located on a fourth diameter,
    said third and fourth diameter being orthogonal with respect to each other and located on the disc whereby each of said diameters are 45 degrees from each other.

2. A fishing float according to claim 1 in which said first fin and said second fin are streamlined and each end of each fin is pointed.

3. A fishing float according to claim 1 in which said disc has a periphery that is circular and said first fin is attached at each end to opposite portions of the periphery of said disc.

4. A fishing float according to claim 1 which includes a pair of line-connecting points on said third diameter and a pair of line-connecting points on said fourth diameter.

* * * * *